US008072472B2

(12) United States Patent
Hunt

(10) Patent No.: US 8,072,472 B2
(45) Date of Patent: Dec. 6, 2011

(54) SYSTEM AND METHOD FOR SCALING OVERLAY IMAGES

(75) Inventor: Neil Edmund James Hunt, Waterloo (CA)

(73) Assignee: AGFA Healthcare Inc., Toronto (CA)

( * ) Notice: Subject to any disclaimer, the term of this patent is extended or adjusted under 35 U.S.C. 154(b) by 0 days.

(21) Appl. No.: 11/474,342

(22) Filed: Jun. 26, 2006

(65) Prior Publication Data

US 2007/0296736 A1 Dec. 27, 2007

(51) Int. Cl.
*G09G 5/00* (2006.01)
(52) U.S. Cl. ........ 345/660; 345/592; 345/629; 382/257; 348/586; 348/590
(58) Field of Classification Search .................. 348/586, 348/590; 345/629, 639
See application file for complete search history.

(56) References Cited

U.S. PATENT DOCUMENTS

| | | | |
|---|---|---|---|
| 4,954,970 A | 9/1990 | Walker et al. | |
| 5,182,728 A | 1/1993 | Shen et al. | |
| 5,920,659 A * | 7/1999 | Iverson et al. | 382/298 |
| 6,128,041 A * | 10/2000 | Han et al. | 375/240.12 |
| 6,172,717 B1* | 1/2001 | Ebihara | 348/586 |
| 6,208,351 B1* | 3/2001 | Borg et al. | 345/600 |
| 6,304,245 B1* | 10/2001 | Groenenboom | 345/611 |
| 6,903,751 B2* | 6/2005 | Saund et al. | 345/619 |
| 7,050,070 B2* | 5/2006 | Ida et al. | 345/629 |
| 2003/0001973 A1* | 1/2003 | Roever | 348/590 |
| 2003/0043390 A1* | 3/2003 | Fritz et al. | 358/1.9 |
| 2003/0223662 A1* | 12/2003 | Chang et al. | 384/276 |
| 2004/0169664 A1 | 9/2004 | Hoffman et al. | |
| 2005/0068336 A1 | 3/2005 | Van Dyke et al. | |
| 2005/0093890 A1* | 5/2005 | Baudisch | 345/639 |
| 2005/0117789 A1* | 6/2005 | Kim et al. | 382/128 |
| 2005/0206652 A1* | 9/2005 | Soroushi et al. | 345/629 |
| 2006/0159360 A1* | 7/2006 | Vaz et al. | 382/257 |
| 2006/0176319 A1* | 8/2006 | Ida et al. | 345/629 |
| 2007/0140559 A1* | 6/2007 | Rambharack et al. | 382/171 |
| 2009/0028432 A1* | 1/2009 | Rossato et al. | 382/173 |

FOREIGN PATENT DOCUMENTS

WO  WO 2004 039938 A2  5/2004

OTHER PUBLICATIONS

Harley R. Maler, Arthur R. Weeks, "The Pocket Handbook of Image Processing Algorithms in C", 1993, Prentice Hall Ptr, Upper Saddle River, New Jersey 07458, pp. 178-179, 252-253, 268-269.
PCT International Search Report/ Written Opinion mailed on Sep. 7, 2007.
Fisher, et al., "Dilation", http://www.cee.hw.ac.uk/hipr/html/dilate.html, Hypermedia Image Processing Reference, Department of Artificial Intelligence, University of Edinburgh, U.K., 1994.
Image Processing Fundamentals, "Morphology-Based Operations", http://www.ph.tn.tudelft.nl/Courses/FIP/noframes/fip-Morpholo.html, 2003.
Optimizing Image Processing With Image, "What are Morphological Operations?", http://www.gemma.apple.com/documentation/Performance/Conceptual, 2005.

* cited by examiner

*Primary Examiner* — Xiao Wu
*Assistant Examiner* — Phi Hoang
(74) *Attorney, Agent, or Firm* — Bereskin & Parr LLP; Isis E. Caulder

(57) ABSTRACT

A system and method for scaling a composite overlay image, wherein the composite overlay image comprises a plurality of pixels and each pixel comprises at least one color channel and at least one alpha channel, and further wherein at least one pixel of the composite overlay image has an alpha value of zero and a color value that is not well defined. First, a set of pixels of the composite overlay image are identified as pixels to be dilated. The color channels of the identified pixels are then dilated to form dilated composite overlay image. Finally, the dilated composite overlay image is scaled.

23 Claims, 15 Drawing Sheets

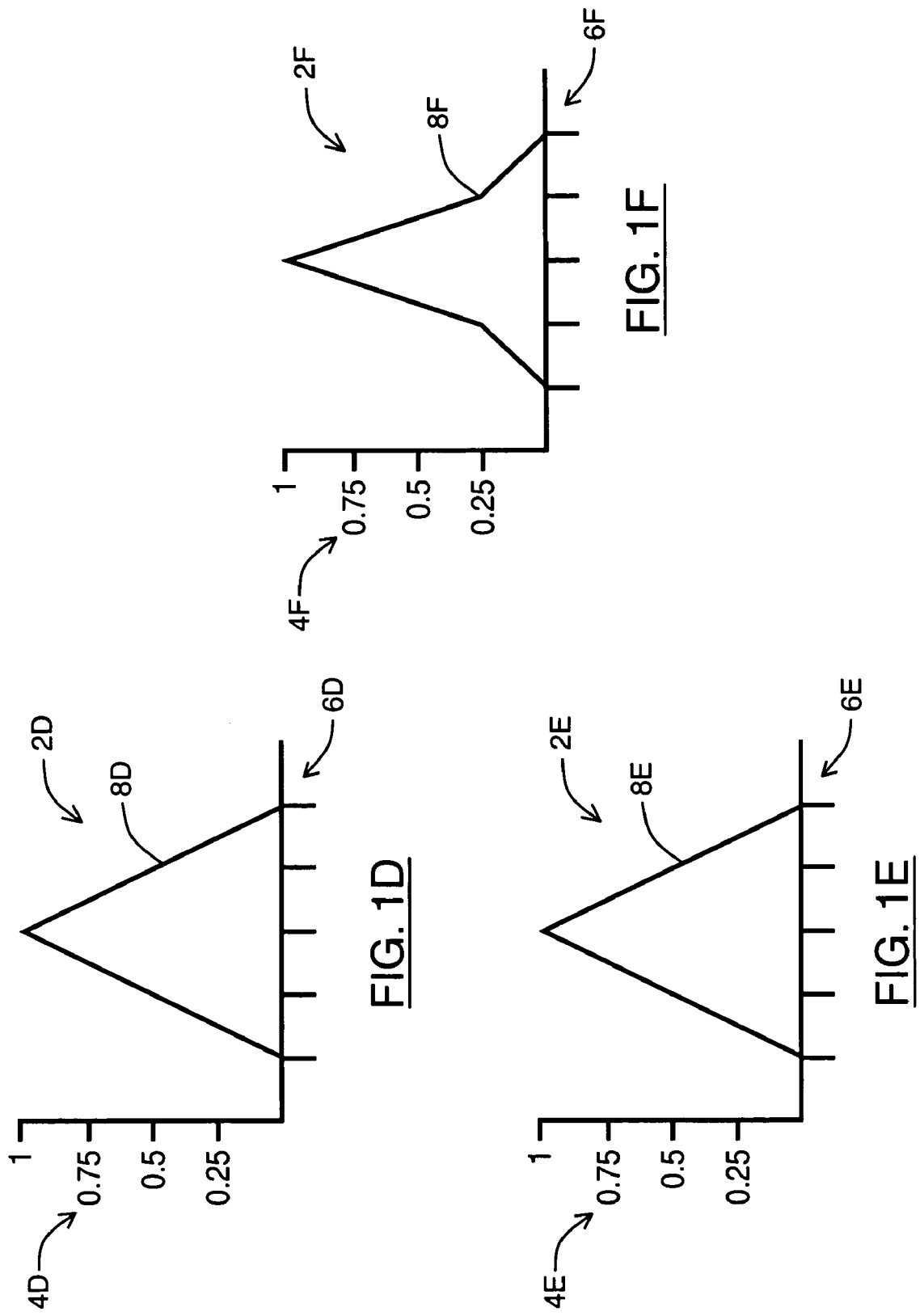

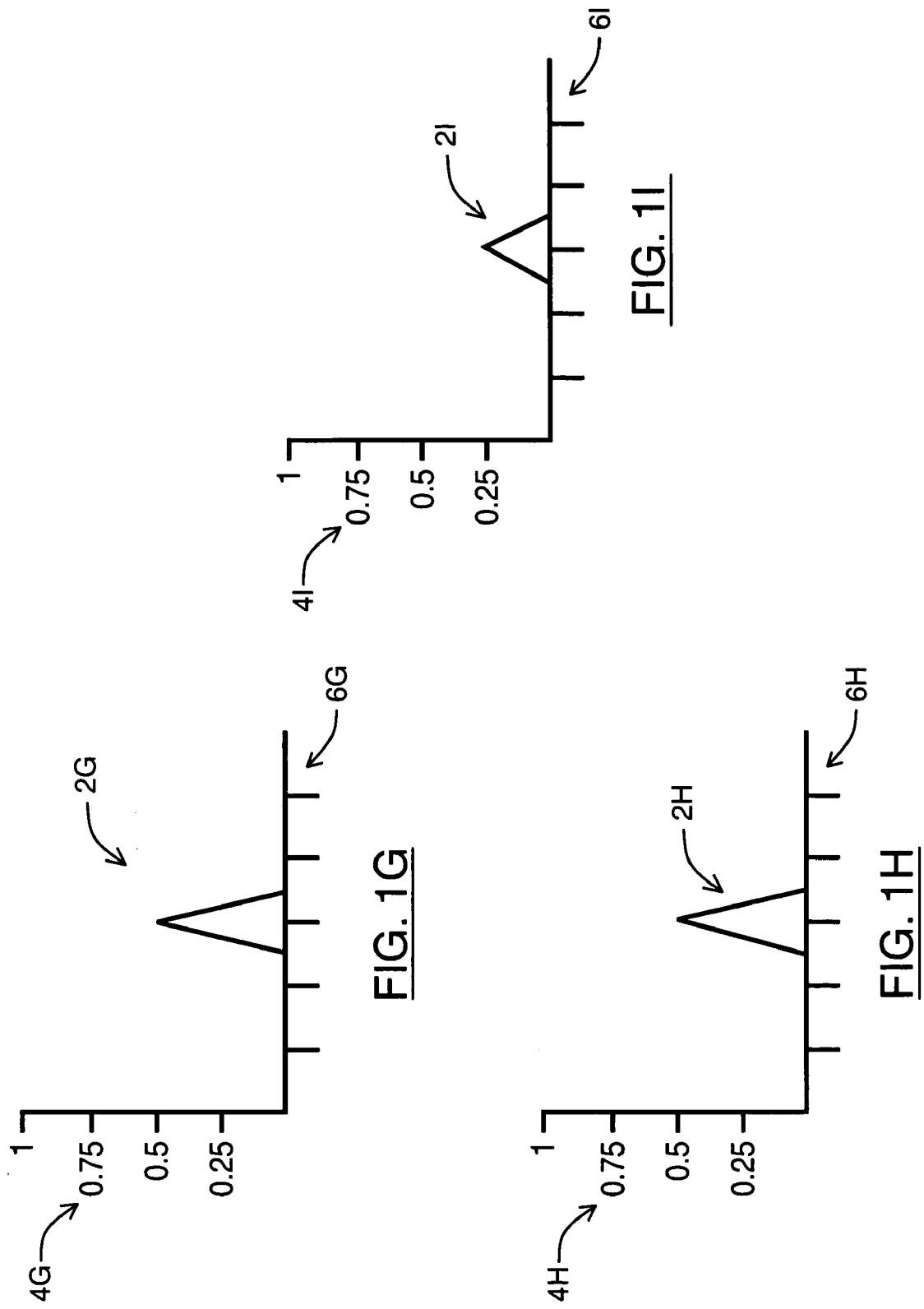

710
| 0 | 0 | 0 | 0 | 0 | 0 | 0 | 0 |
|---|---|---|---|---|---|---|---|
| 0 | 0 | 1 | 0 | 0 | 0 | 0 | 0 |
| 0 | 1 | 0 | 0 | 1 | 1 | 1 | 0 |
| 0 | 1 | 1 | 0 | 0 | 0 | 1 | 0 |
| 0 | 1 | 1 | 0 | 0 | 0 | 1 | 0 |
| 0 | 0 | 1 | 0 | 0 | 0 | 1 | 0 |
| 0 | 0 | 1 | 1 | 0 | 0 | 0 | 0 |
| 0 | 0 | 0 | 1 | 1 | 0 | 0 | 0 |
| 0 | 0 | 0 | 0 | 0 | 0 | 0 | 0 |
FIG. 7A
712
| 0 | 1 | 1 | 1 | 0 | 0 | 0 | 0 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 0 | 1 | 1 | 0 |
| 1 | 1 | 1 | 1 | 1 | 1 | 1 | 0 |
| 0 | 1 | 1 | 1 | 1 | 1 | 1 | 0 |
| 0 | 1 | 1 | 1 | 1 | 0 | 0 | 0 |
| 0 | 0 | 1 | 1 | 1 | 0 | 0 | 0 |
FIG. 7B
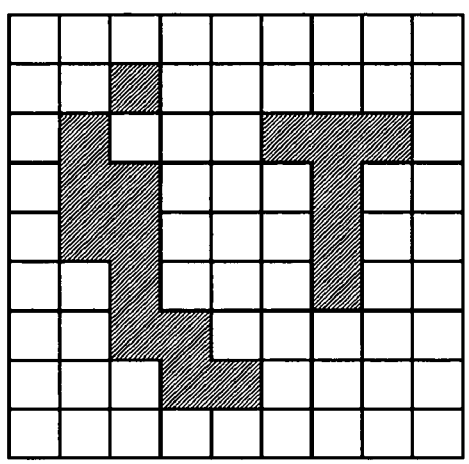
FIG. 7C
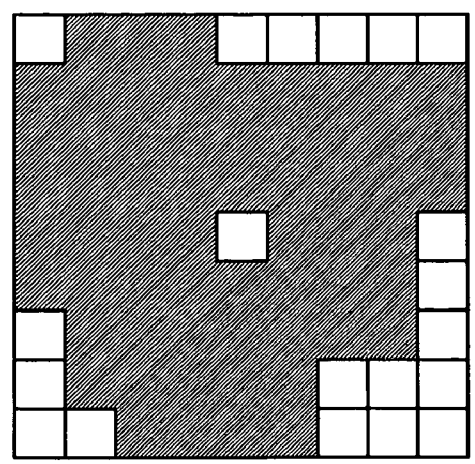
FIG. 7D

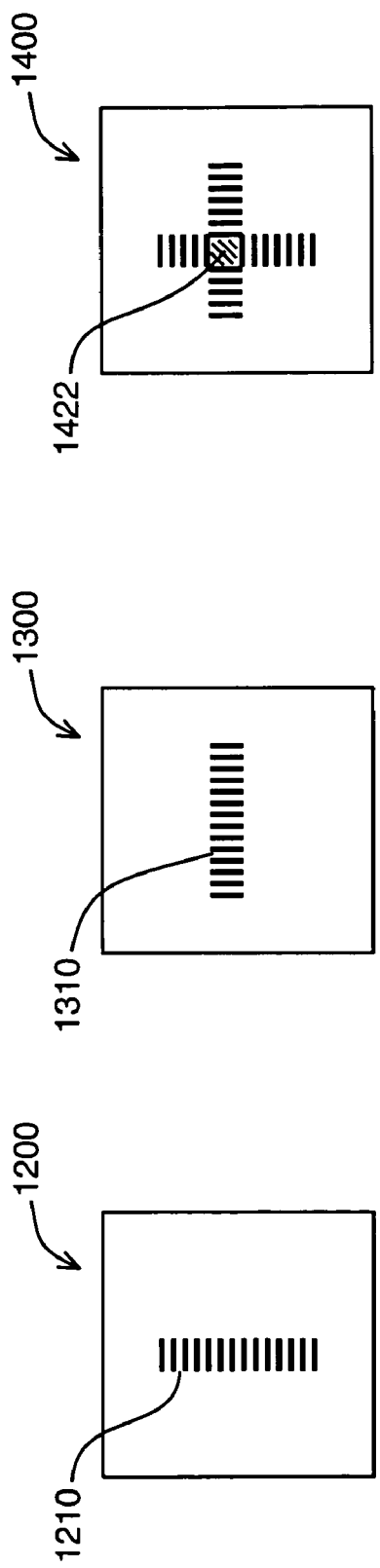
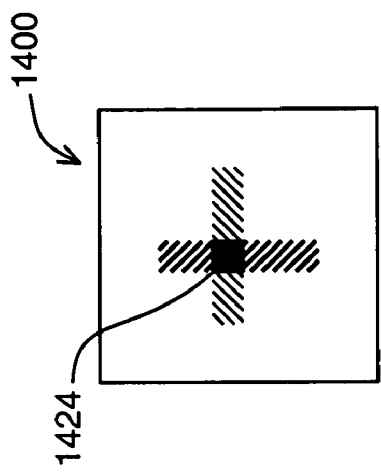
FIG. 14A
FIG. 14B
FIG. 13A
FIG. 13B
FIG. 12A
FIG. 12B

SYSTEM AND METHOD FOR SCALING OVERLAY IMAGES

FIELD

The embodiments described herein relate to the processing of electronic images and in particular to an image transformation system and method for scaling images comprising multicolor and multilayer overlay images.

BACKGROUND

Modern electronic computing devices are becoming increasingly pervasive. These devices commonly include graphic displays that offer the ability to display images of increasing detail and complexity. Often, the images displayed on the graphic displays are multicolored and multilayered and consist of a background image and one or more overlay images. These combined images have applications in a variety of fields including medical imaging applications, such as in Picture Archive and Communication Systems (PACS), and computer graphics generally.

Each pixel of an electronic image, such as that displayed on a computer monitor, may be represented as a series of values. For example, it is common for each pixel of a color electronic image to be represented by the vector (R, G, B, A), where R represents red, G represents green, B represents blue, and A represents the alpha or the opacity. R, G, and B may be referred to as color channels. Similarly, A may be referred to as an alpha channel. Each of the colors channels can take on a value between a predetermined minimum value and a predetermined maximum value. According to one standard, the minimum value is 0 and the maximum value is 255. In addition, according to that standard, each channel can take on an integer value between the minimum and maximum value inclusive, allowing for a total of 256 values. A color channel with a value of 0 generally denotes the absence of that color in the given pixel and a color channel with a value of 255 represents the pixel being fully saturated with that color. The alpha channel (represented as A) may also take on a value between 0 and 255, where 0 represents the pixel being fully transparent and 255 represents the pixel being completely opaque. For example, a pixel represented as (0, 0, 255, 255) is a pixel that is fully blue and fully opaque. However, if the alpha value is set to 100 then the pixel is represented as (0, 0, 255, 100). Such a pixel is fully blue but is translucent.

However, as used from here on in, the terms color channel and alpha channel will be associated with normalized values. Thus, for the color channels 0 will represent the absence of a particular color, while 1 will represent a fully saturated color. Similarly, for the alpha channel, 0 will represent full transparency and 1 will represent full opacity.

An image having an alpha channel may be overlaid on top of another image. Regardless of whether the underlying image has an alpha channel or not, combining the two images may require the blending of colours. Consider the case where the overlay image has an alpha channel and the underlying image does not. Thus, each pixel of the overlay image may be represented as (R, G, B, A) and each pixel of the underlying image may be represented as (R, G, B). When one image with an alpha channel is overlaid on top of another image, which does not have an alpha channel, the color that a particular pixel takes on is dependent on the colors of the pixels of the overlay and background images at that position, as well as the opacity of the overlay image at that position. Thus, for a particular pixel of a combined image, the color values may be calculated as:

$$C_{out} = C_{overlay} * A_{overlay} + C_{image} * (1 - A_{overlay}) \quad (1)$$

wherein $C_{out}$ represents the normalized color channels of the resulting image, $C_{overlay}$ represents the color channels of the overlay image, $C_{image}$ represents the color channels of the background image, $A_{overlay}$ represents the alpha value of the overlay image. Each of the $C_{out}$, $C_{overlay}$, and $C_{image}$ are in fact vectors containing each of the color channels of the particular pixel. For example, $C_{out} = (R_{out}, G_{out}, B_{out})$. The above-described process by which the color channels are combined may be referred to as alpha blending.

It is often necessary to scale and/or rotate images that contain a background image and at least one overlay image. Some prior art methods scale the overlay image and the background image separately before combining the two through the use of alpha blending. This leads to a number of undesirable qualities, such as distortion or artifacts. In particular, in the final image, overlay lines appear thinner than they should. In addition, the edges of overlays may be tinged with a dark shade, which in turn, results in a choppy shadow around the overlay features.

FIGS. 1A to 1I illustrate why the problem occurs in the prior art. As can be seen from Equation (1), the alpha channel effectively serves as a multiplier for the color channels when alpha blending is done. FIGS. 1A to 1C illustrate the prior art methods when no scaling is performed. FIG. 1A is a diagram illustrating a plot 2A of color values at various pixels for a single color channel. Axis 4A represents the value of the color channel while axis 6A represents pixel positions. Thus, the only values of concern in plot 2A are those that appear above the gradations along axis 6A. FIG. 1B illustrates a plot 2B of alpha channel values for the same pixels as in FIG. 1A. FIG. 1C illustrates the color channel values that result from the first product $(C_{overlay} * A_{overlay})$ in Equation (1) at the same pixel positions as in FIGS. 1A and 1B. As can be seen from a comparison of plots 2C and 2A, there is no distortion.

FIGS. 1D to 1F illustrate plots similar to FIGS. 1A to 1C except that they are for the case where the image has been scaled up prior to the application of Equation (1). As can be seen from a comparison of plots 2F and 2D, distortion occurs at the point designated as 8F relative to the point marked as 8D. This occurs because the alpha channel value at 8E serves as a multiplier for the color channel at point 8D.

FIGS. 1G to 1H illustrate similar plots to FIGS. 1A to 1C except that they are for the case where the image has been scaled down prior to the application of Equation (1). As can be seen, distortion occurs in plot 2I relative to plot 2G at the peak. Again, the distortion occurs as a result of the alpha channel value at the peak of plot 2H serving as a multiplier for the color channel at the pixel corresponding to the peak of plot 2G.

One method to overcome these problems is to combine the overlay image with the background image and then scale the combined image. However, this leads to additional problems. In particular, it is often the case that the background image changes or is modified relatively frequently, while the overlay images remain relatively constant. In such a case, this method would be overly computationally intensive and inefficient. Thus, there is a need for a system and method that overcomes the above-mentioned problems and can scale images having a background image and at least one overlay image.

SUMMARY

The embodiments described herein provide in one aspect, a method of scaling a composite overlay image, wherein the composite overlay image comprises a plurality of pixels and each pixel comprises at least one color channel and at least one alpha channel, and further wherein at least one pixel of the composite overlay image has an alpha value of zero and a colour value that is not well defined, said method comprising:

(a) identifying a set of pixels of the composite overlay image as pixels to be dilated;
(b) dilating the color channels of the identified pixels to form a dilated composite overlay image; and
(c) scaling the dilated composite overlay image.

The embodiments described herein provide in another aspect, a system for scaling a composite overlay image, wherein the composite overlay image comprises a plurality of pixels and each pixel comprises at least one color channel and at least one alpha channel, and further wherein at least one pixel of the composite overlay image has an alpha value of zero and a colour value that is not well defined, said system comprising:

(a) a memory for storing the pixels associated with the overlay images;
(b) a processor coupled to the memory for:
  (i) identifying a set of pixels of the composite overlay image as pixels to be dilated;
  (ii) dilating the color channels of the identified pixels to form a dilated composite overlay image; and
  (iii) scaling the dilated composite overlay image.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 1D is a graph illustrating the color channel values of a scaled up image at various pixel positions;

FIG. 1E is a graph illustrating the alpha channel values of the image of FIG. 1D at various pixel positions;

FIG. 1F is a graph illustrating the color channel values of an image that results from the multiplication of color channel values of FIG. 1D by the alpha channel values of FIG. 1E according to prior art methods;

FIG. 1G is a graph illustrating the color channel values of a scaled down image at various pixel positions;

FIG. 1H is a graph illustrating the alpha channel values of the image of FIG. 1G at various pixel positions;

FIG. 1I is a graph illustrating the color channel values of an image that results from the multiplication of color channel values of FIG. 1G by the alpha channel values of FIG. 1H according to prior art methods;

FIG. 6A is a diagram that illustrates one type of kernel utilized by the alpha dilation module of FIG. 2A;

FIG. 6B is a diagram that illustrates a second type of kernel that may be utilized by the alpha dilation module of FIG. 2A;

FIG. 7A is a diagram that illustrates a first exemplary binary image, wherein the transparency of a pixel is represented by an number;

FIG. 7B is a diagram that illustrates the image that results from the application of the kernel of FIG. 6A to the image of FIG. 7A by the alpha dilation module of FIG. 2A;

FIG. 7C is a diagram that illustrates an exemplary binary image, wherein the transparency of the a pixel is represented by a solid or empty square;

FIG. 7D is a diagram that illustrates the image that results from the application of the kernel of FIG. 6A to the image of FIG. 7C by the alpha dilation module of FIG. 1;

FIG. 12A is a diagram that illustrates the color portion of an overlay image;

FIG. 12B is a diagram that illustrates the alpha channel portion of the overlay image of FIG. 12A;

FIG. 13A is a diagram that illustrates the color portion of a second overlay image;

FIG. 13B is a diagram that illustrates the alpha channel portion of the overlay image of FIG. 13A;

FIG. 14A is a diagram that illustrates the color portion of an image formed by combining the overlay images of FIGS. 12A and 13A; and FIG. 14B is a diagram that illustrates the alpha channel portion of an image formed by combining the overlay images of FIGS. 12B and 13B.

Figure 1C:
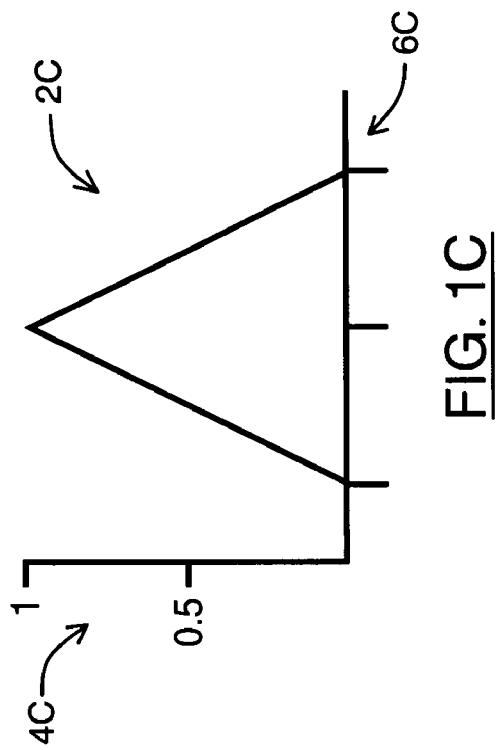
FIG. 1C is a graph illustrating the color channel values of an image that results from the multiplication of color channel values of FIG. 1A by the alpha channel values of FIG. 1B according to prior art methods.
Figure 1A:
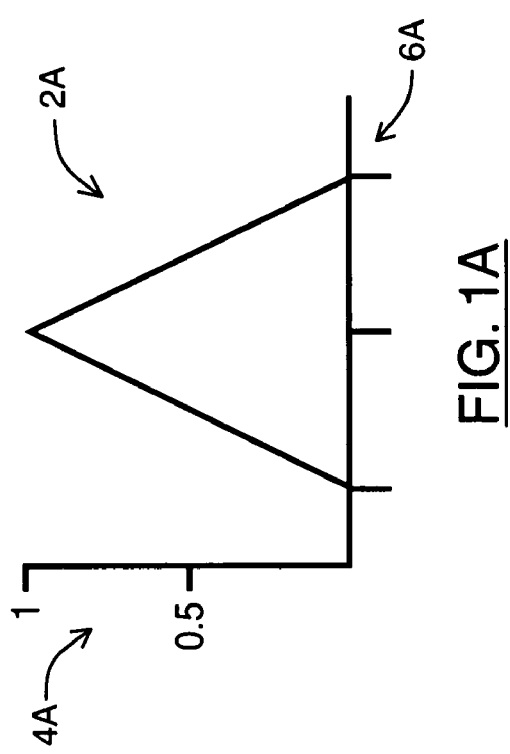
FIG. 1A is a graph illustrating the color channel values of an image at various pixel positions.
Figure 1B:
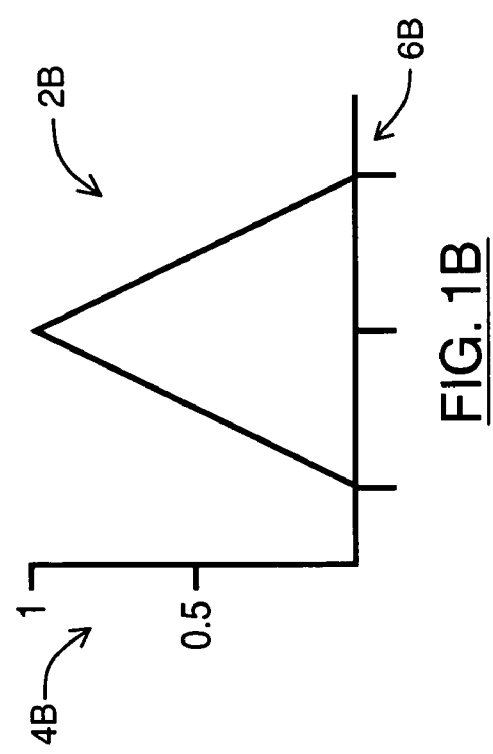
FIG. 1B is a graph illustrating the alpha channel values of the image of FIG. 1A at various pixel positions.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a personal computer, laptop, personal data assistant, and cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and pre-defined manner to perform the functions described herein.

Figure 2A:
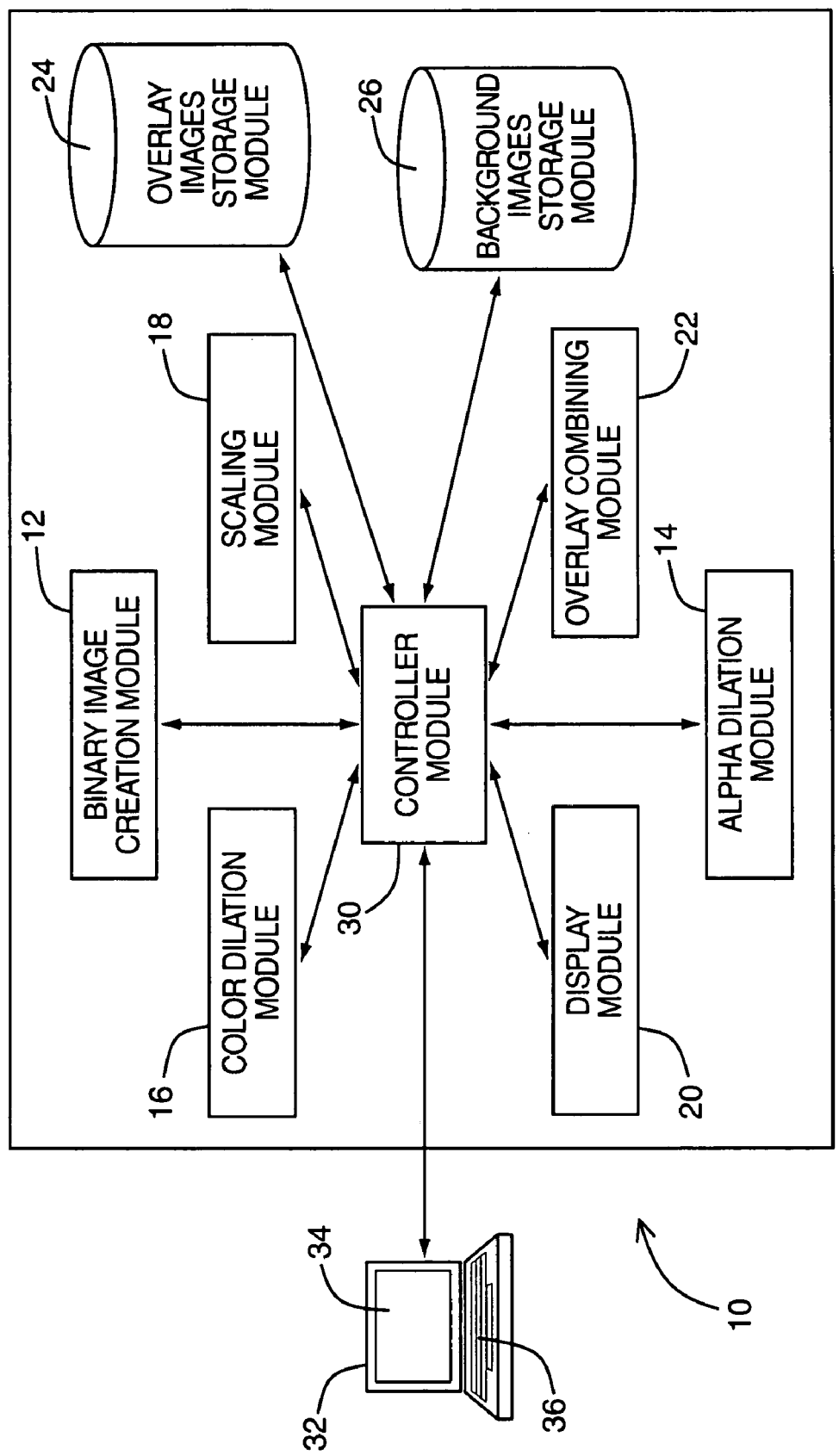
FIG. 2A is a block diagram of the overlay image scaling system.

FIG. 2A is a block diagram illustrating an exemplary embodiment of the overlay image scaling system 10. Overlay image scaling system 10 comprises a number of functional elements including a binary image creation module 12, an alpha dilation module 14, a color dilation module 16, a scaling module 18, a display module 20, an overlay combining module 22, a controller module 30, a first storage module 24 for storing overlay images, and a second storage module 26 for storing background images. The controller module 30 controls and coordinates the actions of the other modules. A user terminal 32, including a display 34 and input device 36, is used to interface with overlay image scaling system 10. User terminal 32 can be any number of devices including but not limited to a personal computer, laptop, medical imaging device terminal, cell phone, and personal data assistant (PDA).

Overlay image scaling system 10 is used to scale multi-color and multilayer images comprising a background image and at least one overlay image. More specifically, it can be used to scale images having multiple overlay planes each of which may have separate colors. Various embodiments of overlay image scaling system 10 may be applied to a variety of image formats. In particular, it can be applied to any overlay image that has at least one color channel and at least one alpha channel. For example, some common formats to which embodiments of the image scaling system 10 may be applied include: the gray scale image format, which utilizes one color channel, the RGB (red, green, blue) image format, which utilizes three color channels, and the CYGM (cyan, yellow, green, magenta) image format, which utilizes four color channels. The above example is meant to be illustrative only and is not intended to be limiting in any way.

As will be explained below, overlay image scaling system 10 combines the overlay images into one composite overlay image. It then dilates the colors of the composite overlay image. It then scales the dilated composite overlay image and background images separately. Finally, it combines the scaled composite overlay image and the scaled background image. Overlay image scaling system 10 operates such that the resulting image is free from any obvious artifacts that may occur in the prior art. In addition, combining the multiple overlays into a single multi-colored overlay prior to scaling, allows for the use of a single color buffer and a single alpha buffer during the execution of scaling algorithms.

Figure 2B:
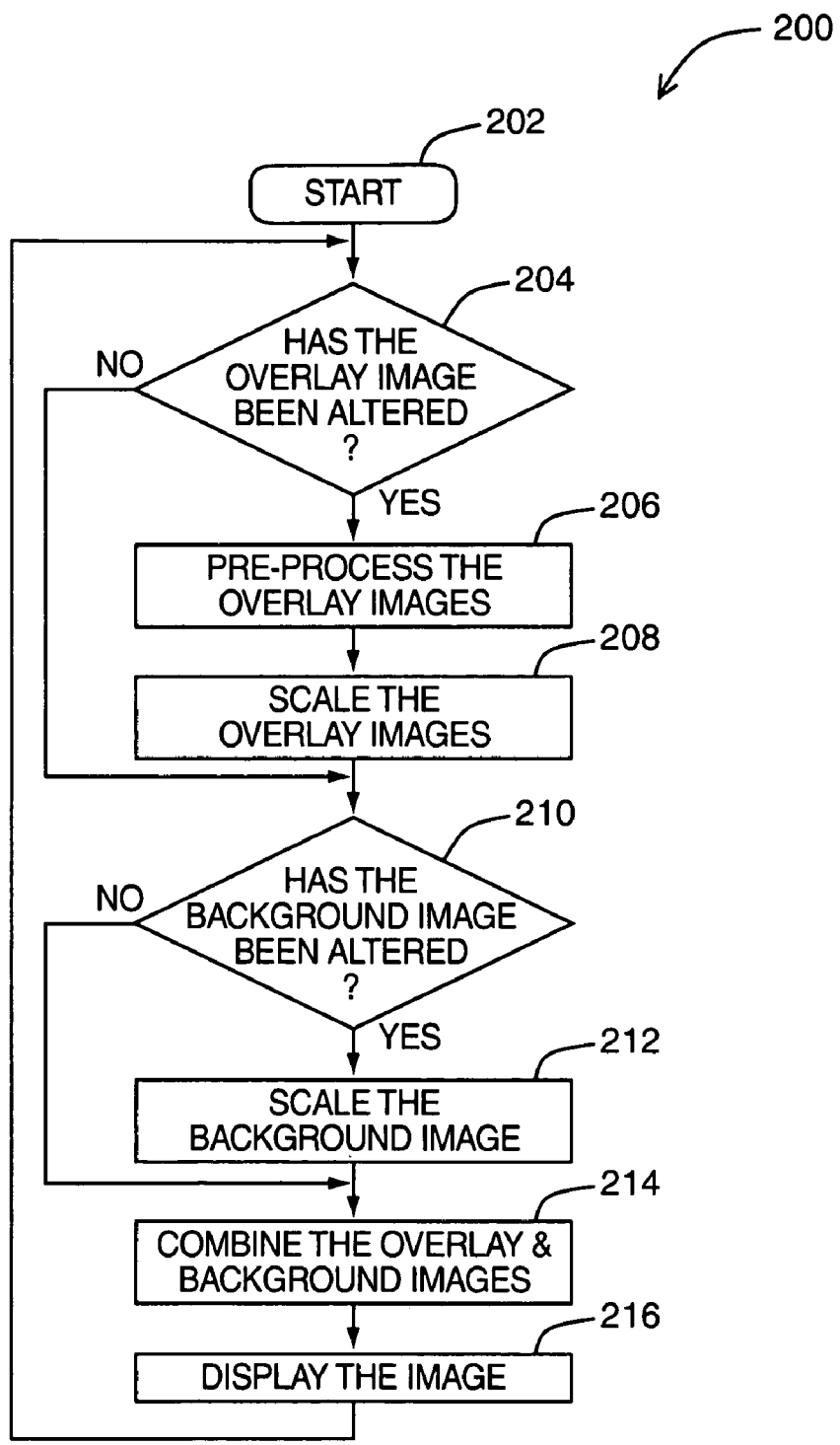
FIG. 2B is a flowchart diagram that illustrates the operation of the overlay image system of FIG. 1.

FIG. 2B is a flowchart that illustrates the basic steps 200 taken by overlay image scaling system 10. The process begins at step (202). At step (204), it is determined whether the overlay image has been altered. If not, then the step (210) is executed. If yes, then step (206) and (208) are executed prior to step (210). At step (206), the overlay image is pre-processed. As will be explained below, this results in a composite overlay image. At step (208), the scaling module 18 scales the composite overlay image to produce a scaled composite overlay image. At step (210), it is determined whether the background image has been altered. If not, then step (214) is executed. If yes, then step (212) is executed. At step (212), the background image is scaled. At step (214), the scaled composite overlay image and scaled background image are combined. This step is accomplished through known alpha blending techniques. At step (216), the display module 20 displays the image on display 34.

Figure 3:
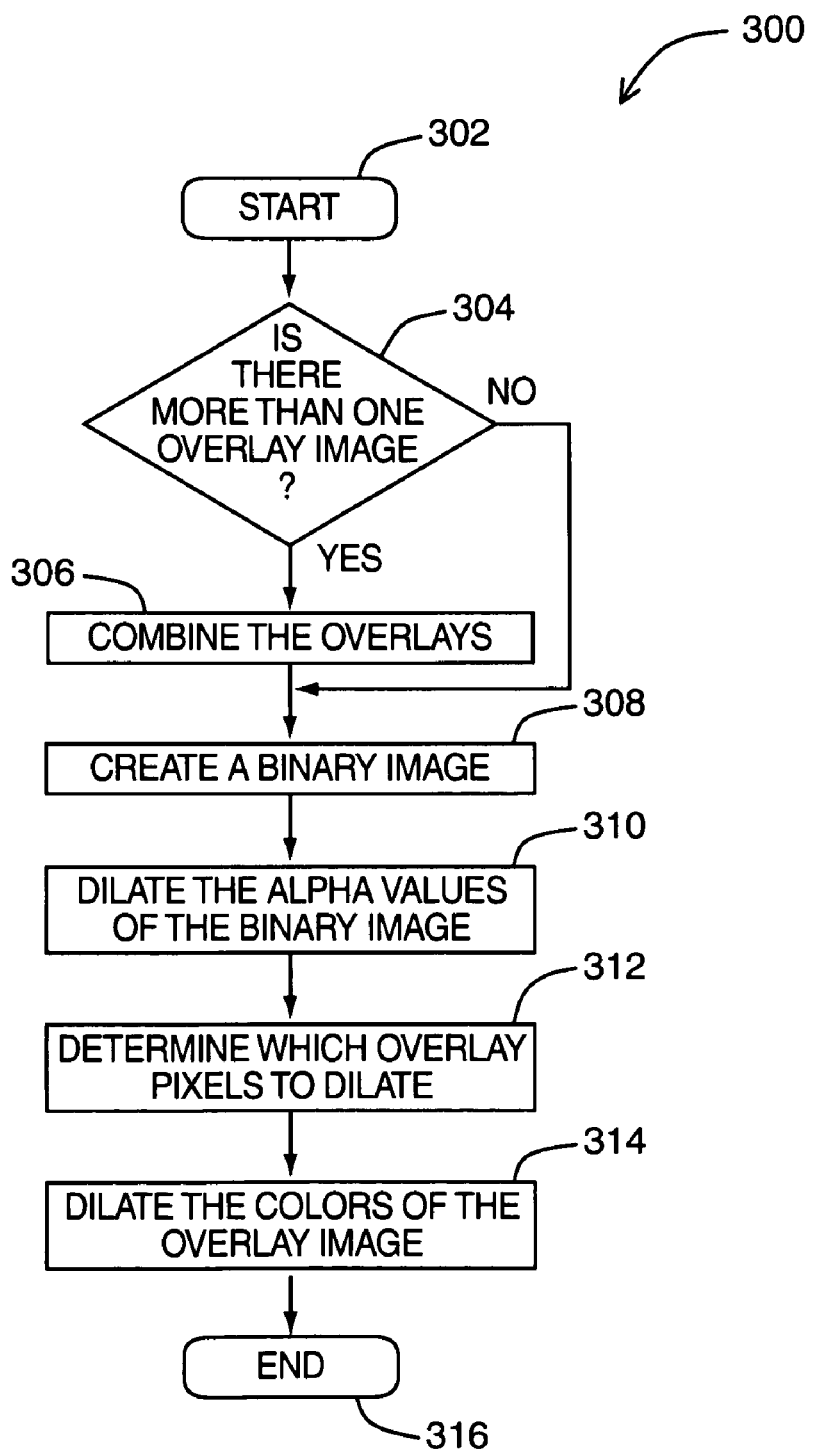
FIG. 3 is a flowchart diagram that illustrates the basic steps taken by the overlay image system of FIG. 2A while pre-processing an image.

FIG. 3 is a flowchart that illustrates the steps 300 taken by overlay image scaling system 10 during the pre-processing of the image. The steps 300 correspond to step (206) of FIG. 2B. The process begins at step (302). At step (304), it is determined whether there is more than one overlay image. If yes, then step (306) is executed. At step (306), the multiple overlay images are combined in any suitable manner to form a composite overlay image. At step (308), a binary alpha representation of the selected overlay image is created. The binary alpha representation is merely a binary representation of the alpha channels of the composite overlay image. It is not a means of storing the actual alpha channels of the composite overlay image. Thus, performing operations on the values stored in the binary alpha representation will have no effect on the actual alpha values of the composite overlay image. In the exemplary embodiment, the binary alpha representation is a binary image. The pixel values of the binary image take on a 0 or 1 value depending on the actual alpha value of the selected overlay image at each pixel. In the exemplary embodiment, the binary image stores a 1 for a pixel with a non-zero alpha channel value and a 0 for a pixel with an alpha channel value of zero. As, will be explained below, the purpose of the creation of this binary image is to keep track of the non-zero alpha channels and thereby determine which pixels should have their color channels dilated. It should be noted however, that in some embodiments the alpha channel will already be binary. In such an embodiment, creating a binary alpha representation will be trivial.

At step (310), the alpha channel dilation module 14 dilates the alpha channels of the binary image to form a dilated binary image. In other embodiments, in which a binary image is not used, this step would form a dilated binary alpha representation. At step (312), the set of pixels of the composite overlay image that should be dilated are identified. As will be explained below, this step involves subtracting the original binary image from the dilated binary image. At step (314), the colours are dilated into the pixel locations identified in the previous step. Then the process ends at step (316). The overlay image that results from this process will be referred to as a dilated composite overlay image.

Figure 4:
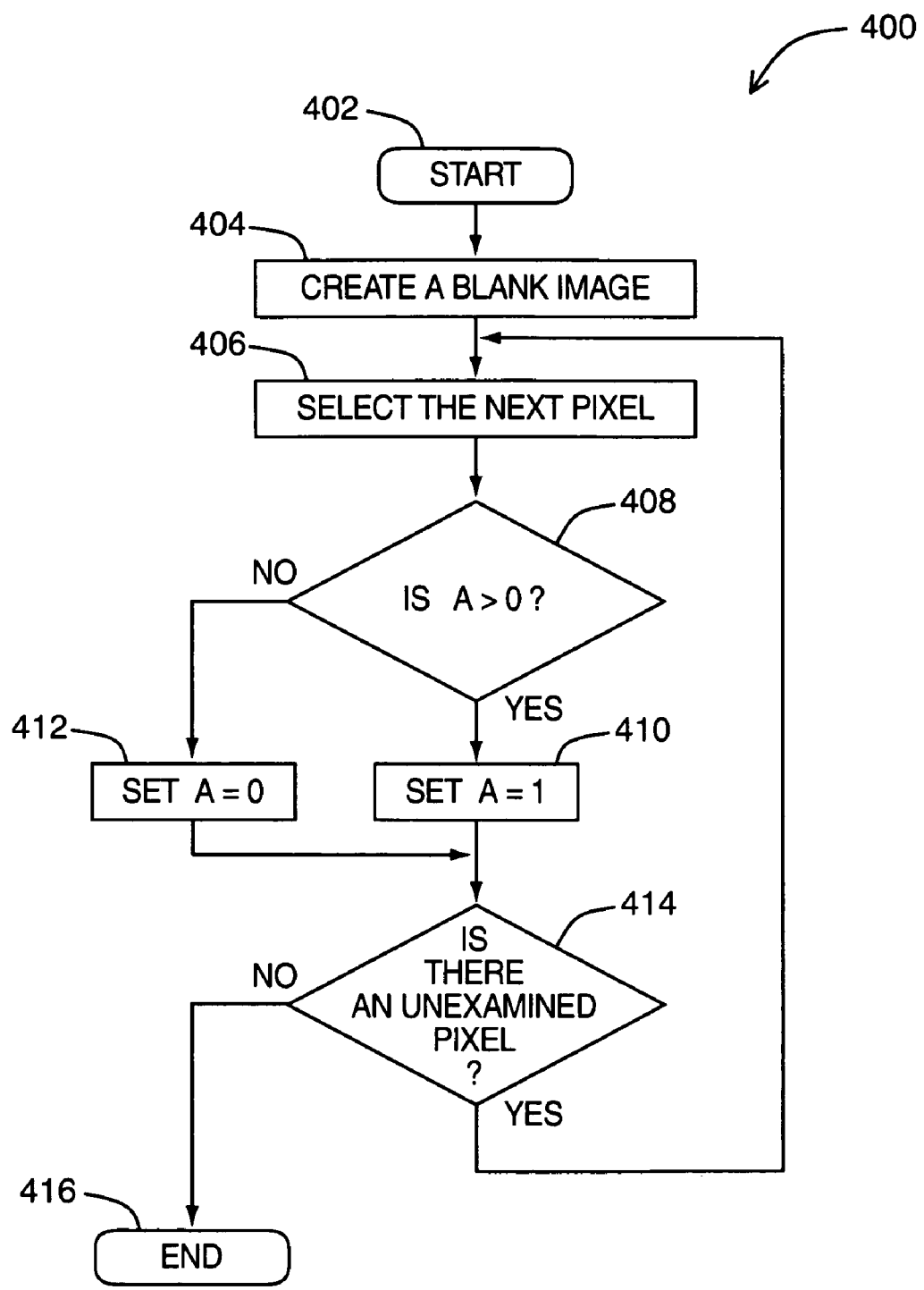
FIG. 4 is a flowchart diagram that illustrates the operation of the binary image creation module of FIG. 2A.

FIG. 4 is a flowchart that illustrates the steps 400 taken by binary image creation module 12 during the creation of a binary alpha representation. The steps 400 correspond to step (308) of FIG. 3. In the exemplary embodiment, the binary alpha representation is a binary image. The binary image creation module 12 creates a binary image. The binary image only contains binary alpha values. The particular value at each pixel of the binary image is dependant on the actual alpha value of the overlay image at the equivalent pixel positions. The binary image is later used to determine which pixels of the corresponding overlay image should be dilated.

The process begins at step (402). At step (404) a blank binary image is created. At step (406), the binary image creation module 12 selects a pixel of the overlay image. The pixel may be selected in any suitable manner. A previously selected pixel is preferably not selected again.

At step (408), it is determined whether the alpha channel of the overlay image pixel selected at step (406) is greater than 0. If yes, then step (410) is executed. At step (410), the alpha channel of the equivalent binary image pixel is set to 1. A binary image pixel is equivalent to an overlay pixel if it is in the same row and column position. In contrast to the above, if at step (408) it is determined that the alpha value of the overlay image pixel is equal to 0, then step (412) is executed. At step (412), the alpha channel of the equivalent binary image pixel is set equal to 0. Regardless of whether step (410) or step (412) is executed, the next step is (414). At step (414), it is determined whether or not the overlay image has a pixel that has not yet been processed. If not, that is if all pixels have been processed, then the process ends at step (416). If, on the other hand, there are pixels that have not yet been processed, then step (406) is repeated.

It should be understood that this is exemplary only. Other embodiments do not store the binary alpha values in an image format, but rather use other suitable representations. In particular, the binary alpha representation need not be a raster scan. The term raster scan is used to refer to a representation in which each element is individually defined. For example, in the above-mentioned binary image, each pixel is individually defined as being either a 1 or a 0. In contrast, in a second embodiment, the binary alpha representation is an array of objects. Instead of specifying the alpha value of each pixel individually, this array comprises objects that define ranges of consecutive appearance of a particular value of alpha. Each of these objects may be referred to as a range object. Since the alpha channels of the binary alpha representation are binary, only one of the alpha values needs to be considered. This follows from the fact that if the alpha channel of a particular pixel is not a 0 then it must be a 1 and vice versa. Thus, each range object could be the vector (row#, start_column, end_column), where row# defines the row number of the image, start_column defines the column at which the particular value of alpha begins, end_column defines the column at which it ends. Thus, if the second row of an image has non-zero alpha channels from the third to the ninth column, then one of the range objects in the array would comprise the vector (2, 3, 9). Another alternative is to use an array that stores transition points. Each object would store the point after which the alpha channel changes from a 0 to 1 or vice versa.

Regardless of what method is used, it preferably possible to discern from the binary alpha representation whether each pixel of the overlay image has a zero or non-zero alpha channel. Thus, both alpha channel and position information are preferably stored. In the case of the binary image, the position information is present in that the binary values are stored in pixel position that correspond to the pixel positions of the alpha channels that they represent.

Figure 5:
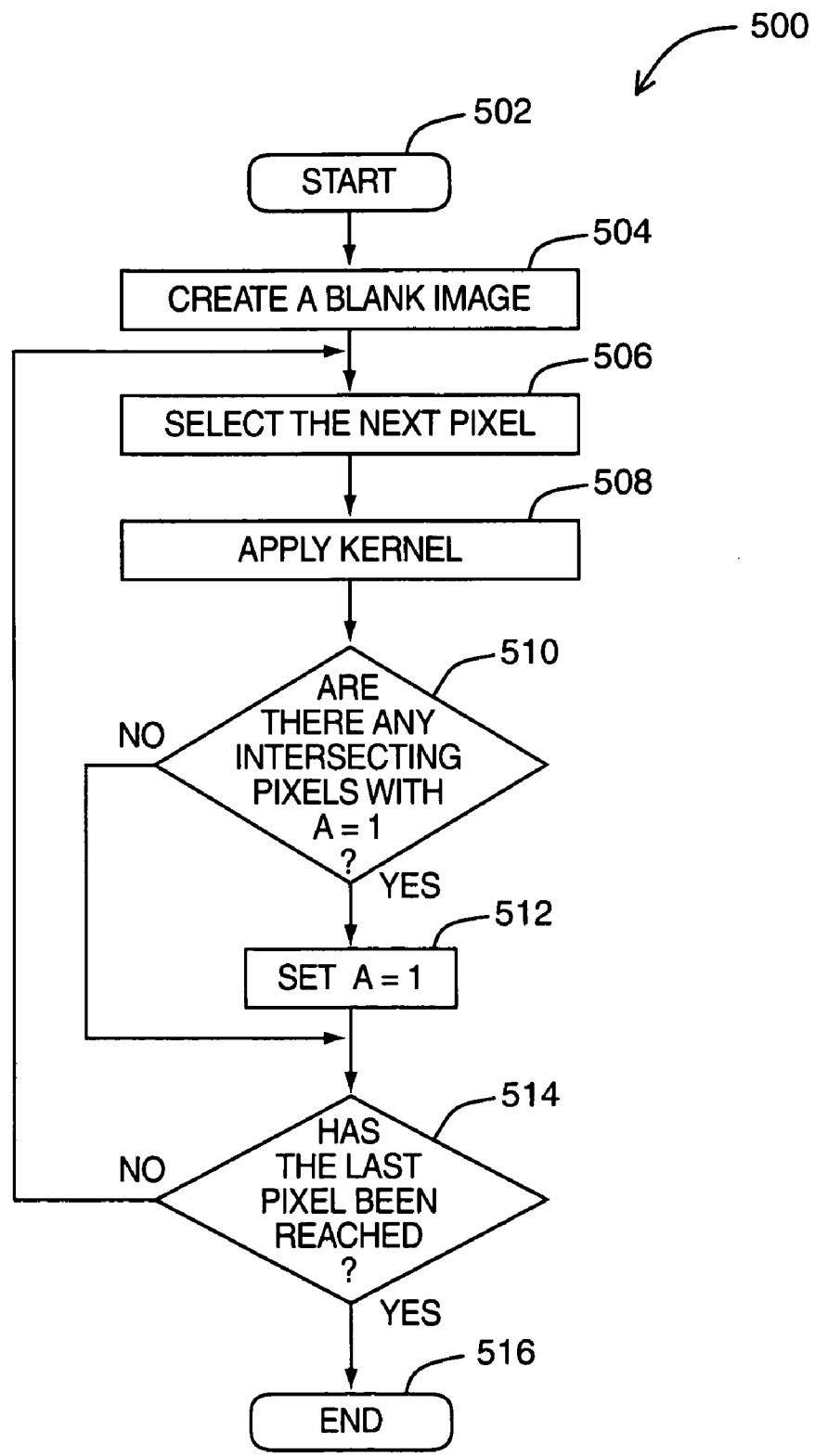
FIG. 5 is a flowchart diagram that illustrates the operation of the alpha dilation module of FIG. 2A.

FIG. 5 is a flowchart that illustrates the steps 500 taken by the alpha dilation module 14. These steps are used to create a dilated binary alpha representation from the binary alpha representation created above according steps 400. In the case of the exemplary embodiment, the dilated binary alpha representation is a dilated binary image. As explained above, with respect to the creation of the binary image, it is not necessary that an actual image be used. Any suitable representation may be used, such as one of the arrays described above.

The process begins at step (502). At step (504) a blank binary image is created. At step (506), the alpha dilation module 14 selects a pixel of the binary image. The pixel may be selected in any suitable manner. Preferably, a previously selected pixel is not selected again. At step (508), a kernel, which can also be referred to as a structuring element, is applied to the binary image. The kernel is applied by placing its origin over a pixel of the image. Examples of two possible kernels are illustrated in FIGS. 6A and 6B.

At step (510), it is determined whether or not any of the 1's within the kernel intersect with any of the pixels in the binary image that have an alpha channel of 1. If yes, then step (512) is executed. At step (512), the alpha channel of the corresponding pixel of the dilated binary image is set equal to 1. The corresponding dilated binary image pixel is the pixel at the same column and row position as the binary image pixel to which the kernel is applied. After step (512), step (514) is executed. If at step (510) it is determined that there are no pixels with an alpha value of 1 intersect with the 1's in the kernel, then step (512) is bypassed and step (514) is executed. At step (514), it is determined whether the last pixel of the binary image has been reached. If not, then step (506) is repeated. If yes, then the process ends at step (516).

In an alternative embodiment the kernel may be applied in a different manner. In particular, a two-dimensional kernel, such as the one illustrated in FIG. 6A, can be separated into one-dimensional components. Thus, the image may first be dilated along each row and then the resulting image may be dilated along each column. In embodiments utilizing a binary representation that is in the form of a raster as described above, this alternative allows for very simple dilation along the row direction. This follows from the fact that the representation already stores the locations at which the alpha channel changes values. The dilation of the columns is performed by the union of regions from the rows above and below a selected row. This alternative application may be particularly efficient when the binary alpha transitions are sparse, or in other words when the alpha channel is relatively uniform.

The steps 500 illustrated in FIG. 5 may be repeated more than once. The number of times that steps 500 are performed depends in part on the scaling algorithm used when scaling the overlay image. For example, if bilinear interpolation is utilized, then a single binary dilation is sufficient. A single binary dilation corresponds to a single pass through steps 500. On the other hand, if the scaling algorithm utilizes a larger kernel-size, then more than one pass may be required. Generally, the larger the kernel size utilized by the scaling algorithm, the greater the number of binary dilations or repetitions of steps 500 required.

FIGS. 6A and 6B illustrate two different kernels 610 and 620, which may also be referred to as structuring elements, that can be utilized by alpha dilation module 14. As mentioned above, kernel 610 or 620 can be applied by placing its origin over each pixel of an image. The origins of kernels 610 and 620 are indicated as 612 and 622, respectively. When kernel 610 is applied it takes into account pixels that are diagonally adjacent to the pixel at its origin. In contrast, kernel 620 only takes into account the pixels that are horizontally or vertically adjacent to the pixel at its origin.

Reference is now made to FIGS. 7A and 7B. FIG. 7A illustrates an exemplary binary image 710 that is 9 pixels wide and 9 pixels tall and contains binary alpha channels. Image 710 represents a binary image created by binary image creation module 12 according to steps 400 of FIG. 4. Every pixel of image 710 having a 0 corresponds to a pixel of an overlay image pixel having a 0 alpha channel. Every pixel of image 710 having a 1 corresponds to a pixel of an overlay image pixel having a nonzero alpha channel. FIG. 7B illustrates the image 712 that results from the application of kernel 610 to image 710 of FIG. 7A by alpha dilation module 14 according to steps 500 of FIG. 5.

FIGS. 7C and 7D illustrate the same images as FIGS. 7A and 7B, except that each pixel with an alpha value of 1 is represented as a solid square instead of a 1 and each pixel with an alpha value of 0 is represented as an empty square instead of a 0. Image 720 of FIG. 7C corresponds to image 710 of FIG. 7A and image 722 of FIG. 7D corresponds to image 712 of FIG. 7B.

Figure 8:
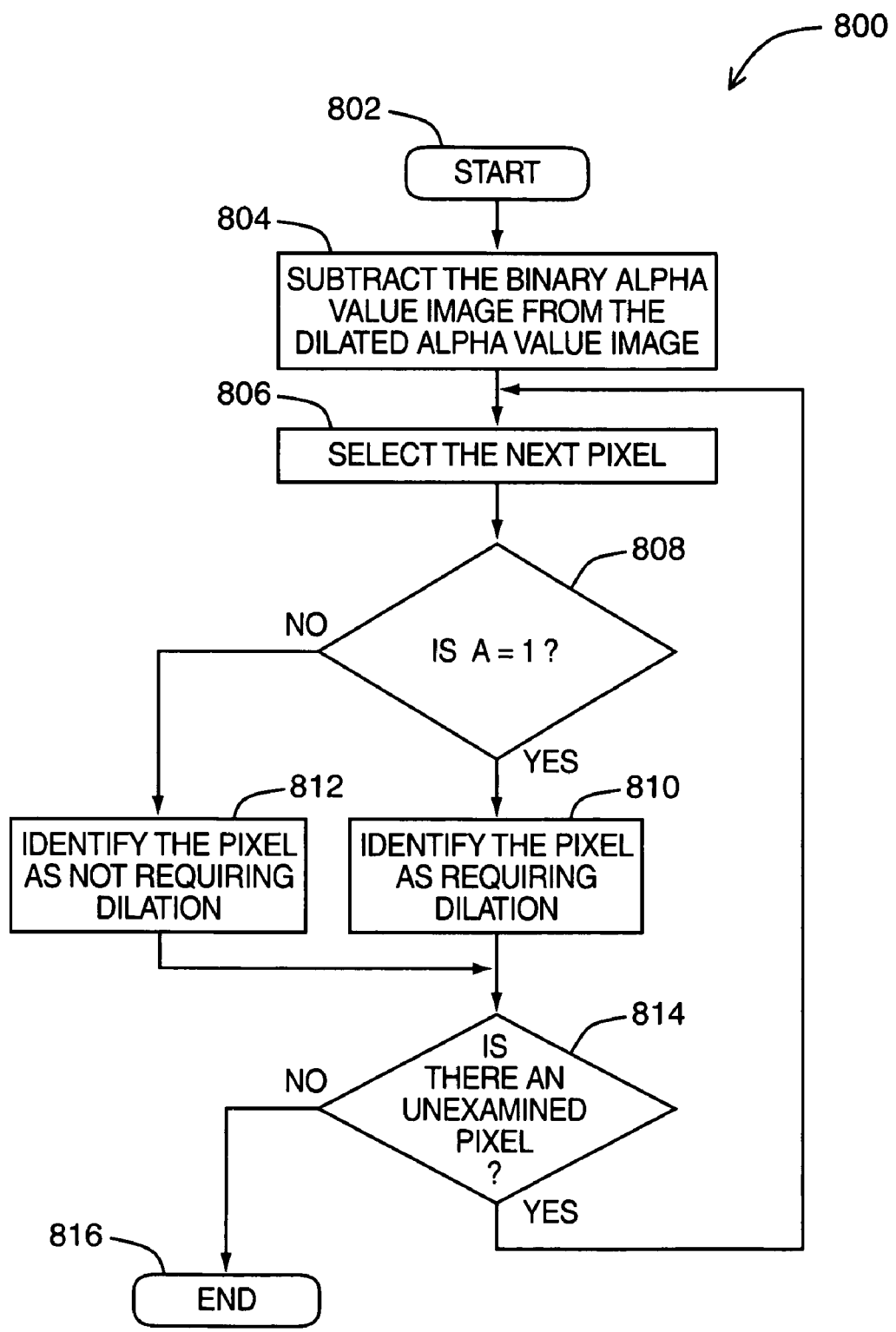
FIG. 8 is a flowchart diagram that illustrates the steps taken by the color dilation module of FIG. 2A when determining which pixels to dilate.

FIG. 8 is a flowchart that illustrates the steps 800 taken by color dilation module 16 when determining which pixels of an overlay image require color dilation. The process begins at step (802). At step (804), the binary alpha representation is subtracted from the dilated binary alpha representation to form a subtracted binary alpha representation. In the case of the exemplary embodiment, the binary image is subtracted from the dilated binary image to form a subtracted binary image. It is important to note that the term subtraction is not used in a strict mathematical sense. The binary alpha representation will contain a number of binary values, which may be represented as 0 and 1. The dilated binary alpha representation will contain all the 1's that the binary alpha representation contains plus any additional 1's that result from dilation. The subtracted binary alpha representation contains only the additional 1's that resulted from the dilation process. The original 1's have been removed by the subtraction process. Thus, subtraction as used herein, refers to this removal regardless of how it is achieved. Therefore, even though they are referred to as being subtracted from one another, it is not necessary that the binary alpha representation and the dilated binary alpha representation be actual mathematical objects that are capable of being subtracted from one another.

At step (806), a pixel of the subtracted binary image is selected in any suitable manner. Preferably, a previously selected pixel is not selected again. At step (808), it is determined whether the alpha channel of the pixel is equal to 1. If yes, then step (810) is executed. At step (810), the pixel is identified as a pixel requiring color dilation. If the answer reached at step (808) is no, then step (812) is executed in place of step (810). At step (812), the pixel is identified as a pixel not requiring dilation. Regardless of whether step (810) or (812) is executed, step (814) is executed next. At step (814) it is determined whether there are pixels that have not yet been examined. If not, then the process ends at step (816). If yes, then step (806) is repeated.

Figure 9:
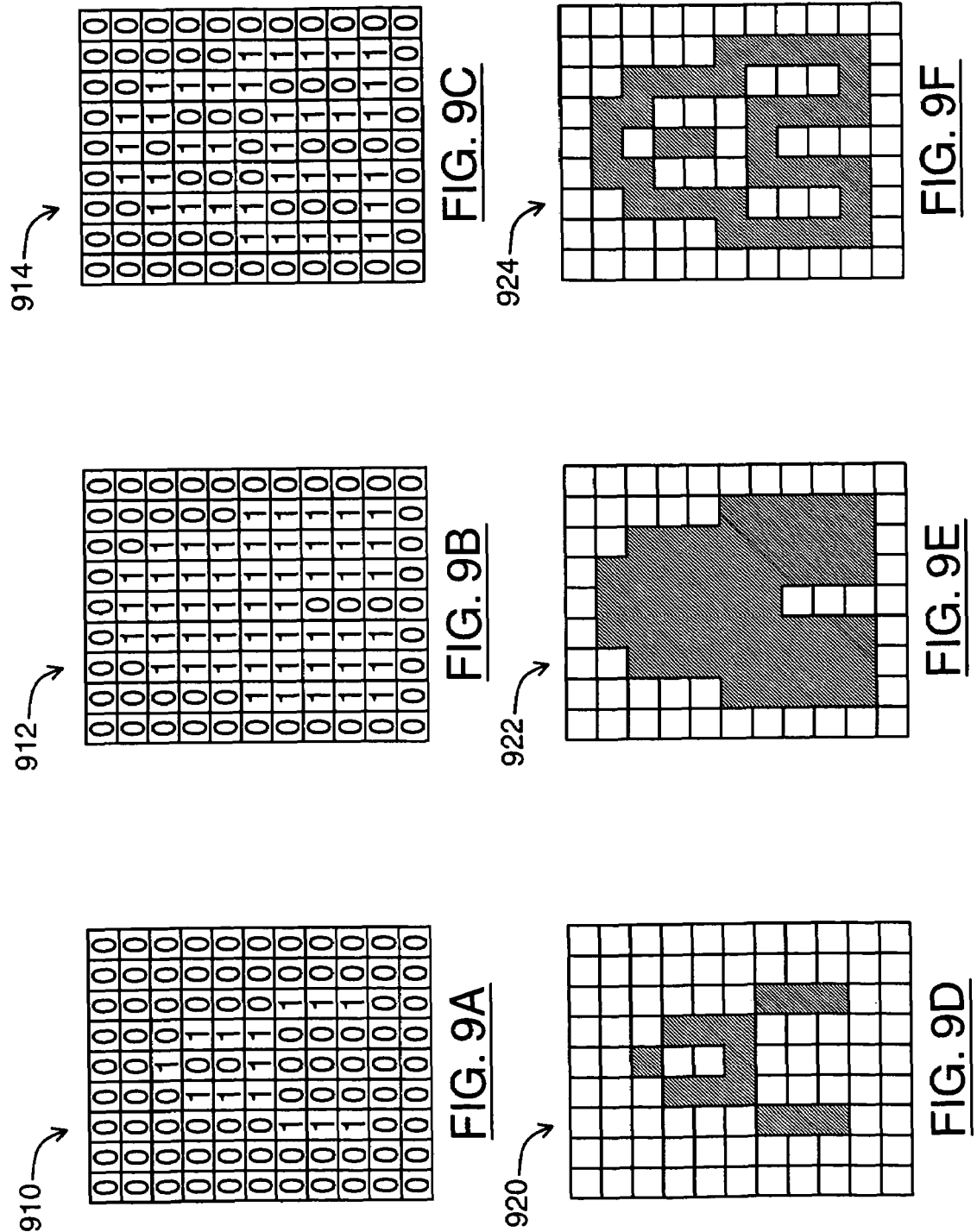
FIG. 9A is a diagram that illustrates another exemplary binary image, wherein the transparency of a pixel is represented by an number.
FIG. 9B is a diagram that illustrates the image that results from the application of the kernel of FIG. 6A to the image of FIG. 9A by the alpha dilation module of FIG. 2A.
FIG. 9C is a diagram that illustrates the image that results from the subtraction of the image of FIG. 9A from the image of FIG. 9B.
FIG. 9D is a diagram that illustrates the binary image of FIG. 9A, wherein the transparency of a pixel is represented by a solid or empty square.
FIG. 9E is a diagram that illustrates the image that results from the application of the kernel of FIG. 6A to the image of FIG. 9D by the alpha dilation module of FIG. 2A.
FIG. 9F is a diagram that illustrates the image that results from the subtraction of the image of FIG. 9D from the image of FIG. 9E.

FIGS. 9A, 9B and 9C, illustrate three exemplary images 910, 912 and 914, respectively. Each of the binary images is 9 pixels wide and 11 pixels tall. The alpha channel is represented as either a 0 or 1. Binary image 910 is an image as created by binary image creation module 12, according to steps 400. Image 912 is the dilated binary image that results from dilating image 910 according to steps 500 taken by alpha dilation module 14. Image 914 is the subtracted binary image that results from subtracting image 910 from image 912 as is done in step 804 of FIG. 8.

FIGS. 9D, 9E and 9F illustrate three exemplary images 920, 922 and 924, respectively. Each of these images corresponds to an image illustrated in FIG. 9A, 9B or 9C. Image 920 corresponds to image 910, image 922 corresponds to image 912, and image 924 corresponds to image 914. In FIGS. 9D, 9E and 9F a pixel with an alpha channel of 0 is represented as an empty square and a pixel with an alpha channel of 1 is represented as a solid square. FIGS. 9D, 9E and 9F are included in order to illustrate the effects of dilation and binary subtraction more clearly.

Figure 10:
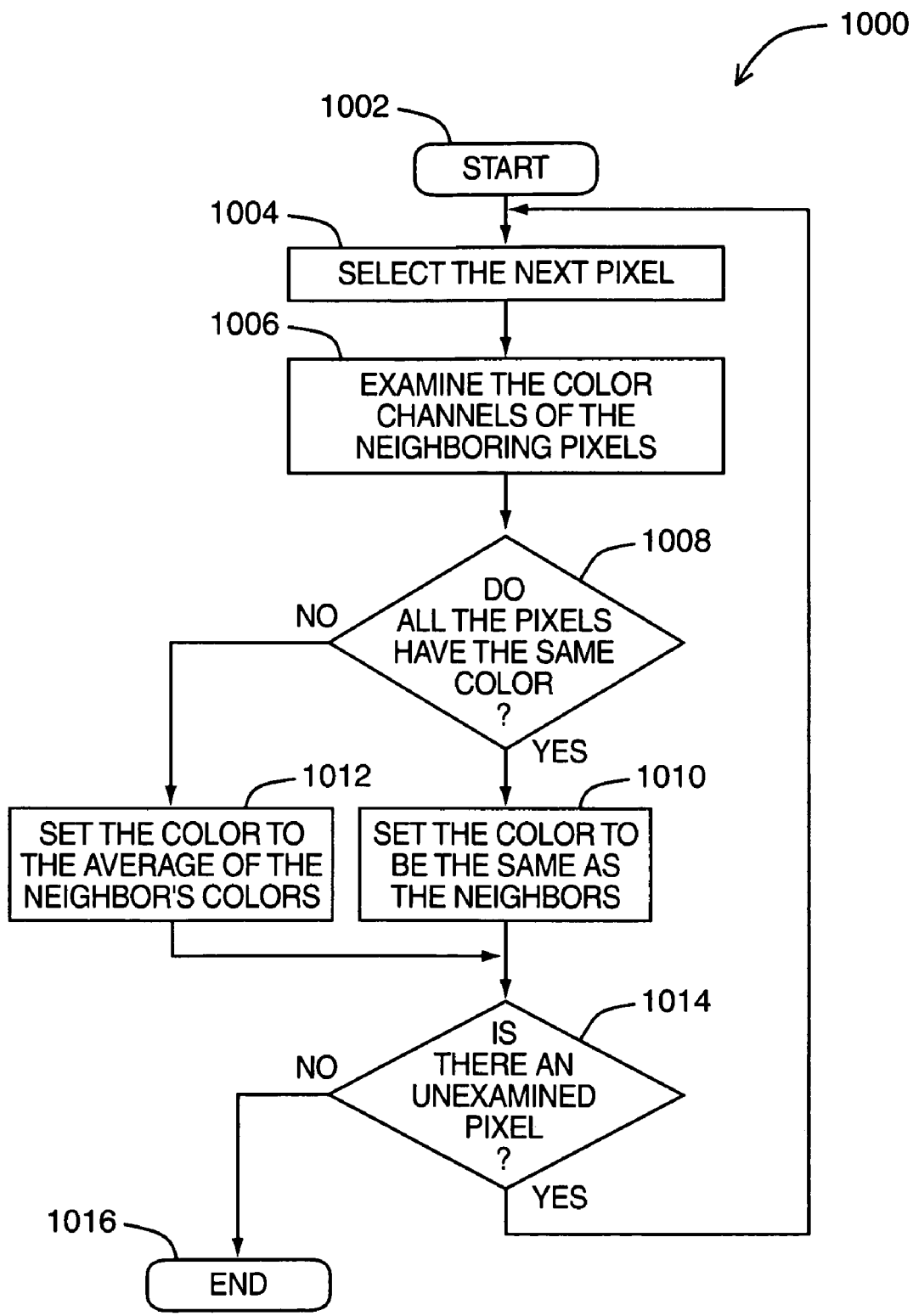
FIG. 10 is a flowchart diagram that illustrates the steps taken by the color dilation module of FIG. 2A when dilating the color channels of an overlay image.

FIG. 10 is a flowchart that illustrates the steps taken by color dilation module 16 according to one method of dilating the colors of the pixels. The process begins at step (1002). At step (1004), a pixel of the overlay image is selected in any suitable manner from the set of pixels that were identified at step (810) of FIG. 8 or step (312) of FIG. 3. Preferably, a previously selected pixel is not selected again. At step (1006), all pixels in the neighborhood are examined and their color channels are identified. In one embodiment, pixels with an alpha channel of 0 are ignored. The size of the neighborhood is determined in part by the scaling algorithm used by scaling module 18. For example, if bilinear scaling is used then the neighborhood comprises only the immediate neighbors. However, for other scaling algorithms, such as bicubic scaling, the neighborhood may be larger.

At step (1008), it is determined whether the color channels of all the pixels in the neighborhood are the same. If yes, then step (1010) is executed. At step (1010), the color settings of the pixel are set to be the same as that of its neighbors. However, if the answer reached at step (1008) is no, then step (1012) is executed. At step (1012), the color channels of the neighbors are averaged and the color channels of the selected pixels are set to the average. The averaging may be performed by any suitable means. For example, in an embodiment in which the original images already have binary alpha values and where only the 8 neighboring pixels are used, the averaging step can be achieved by a simple average. However, in other embodiments the averaging may be accomplished by a weighted average. The weights can be determined by a number of factors including the alpha value at the pixel, the proximity of the pixel, and the position of the pixel. As an example of where the position may be used to affect the weighting, if a 3×3 kernel is used, then the corner pixels may be given less weight than the pixels that are horizontally or vertically adjacent. Similarly, an example of where the proximity may be used to affect the weighting is in a 5×5 kernel the pixels that are immediately horizontally or vertically adjacent may be given greater weight than the pixels that are two pixels away in the horizontal or vertical direction. In the exemplary embodiment, the color of the pixel is calculated according to the following Equation:

$$C_{average} = \frac{\sum_{i=1}^{n} C_i A_i}{\sum_{i=1}^{n} A_i} \quad (2)$$

where $C_{average}$ is the vector of the color channels of the pixel that was dilated into, $C_i$ and $A_i$ are the color and alpha channels of the neighboring pixels, and n is the number of neighboring pixels that are used by the equation. In the exemplary embodiment the eight neighboring pixels are used and therefore n=8. As mentioned above, in an alternative embodiment the pixels diagonally adjacent may be given less weight than those that are immediately horizontally or vertically adjacent. In such an embodiment, the color of the pixel is calculated according to the following equation:

$$C(x,y)_{average} = \frac{\sum_{i=-1}^{1} \sum_{j=-1}^{1} K(i,j)C(x+i, y+j)A(x+i, y+j)}{\sum_{i=-1}^{1} \sum_{j=-1}^{1} K(i,j)A(x+i, y-j)} \quad (3)$$

where $C(x,y)_{average}$ is the output color value at the column and row pixel position (x,y) in the overlay image. C(a,b) and A(a,b) are the input overlay color values and alpha values respectively, at overlay pixel (a,b). Equation (3) is a vector equation and each color channel is calculated in the same manner.

K(i,j) are the kernel weights used for averaging the colors. In this alternative embodiment, the kernel is a 3×3 kernel and therefore the i and j values range from −1 to +1. However, in other embodiments the kernel may be of a different size and the i and j values would vary appropriately. In this alternative embodiment, K(0,0), which represents the center of the kernel, is 0. This means that for the purpose of Equation (3), the summation may be made shorter by skipping the step for which (i,j)=(0,0). In addition, the kernel values at each corner are also 0, which may be represented as K(±1,±1)=0. The above equation is meant to be exemplary only. As mentioned above, the number of pixels used is in part dependant on such things as the scaling algorithm used. For example, for bilinear scaling choosing n=8 is sufficient. However, for bicubic scaling a larger number of pixels are used. Specifically, for bicubic scaling a 5×5 dilation kernel may be used. This would give 24 neighboring pixels, 8 of which are immediately adjacent and 16 of which are two pixels away. In addition, in one embodiment neighboring pixels with an alpha channel of 0 are ignored and the alpha channel of the original image is already binary. In such an embodiment, the calculation of $C_{average}$ can be written according to the following pseudo code:

```
ColorTotal = {0,0,0}
NumAlphas = 0
For each n
{
    if Alpha_n != 0
    {
        C_average += Color_n
        NumAlphas += 1
    }
}
C_average = ColorTotal / NumAlphas
```

The actual method used to determine the color of the pixel that is dilated into, may be determined according to the particular implementation utilized. One of the above-described methods may be more efficient than the other in one implementation, but may be less efficient in a second implementation. Thus, knowledge of the particular implementation is helpful in determining which method to use.

Regardless of whether step (1010) or (1012) is executed, step (1014) is executed next. At step (1014), it is determined whether there are pixels that have not yet been examined. If not, then the process ends at step (1016). If yes, then step (1004) is repeated. It is important to note that color dilation module 16 does not affect the alpha channels of the overlay image; only the color channels of the overlay image are affected by color dilation module 16 during steps 1000.

The flowchart presented in FIG. 10 is meant to be exemplary only. There are other possible methods. For example, steps (1010) and (1012) could be replaced with a step that performs some form of convolution. A convolution could achieve the affects of both steps (1010) and (1012) in one step. As a second example, if the overlay is layered then the color chosen to be dilated into a given pixel could be the top most color of the overlay at that location. This method is simpler allows some of the dilation to occur as the overlay images are combined into one image. However, the results produced may not be as good as those achieved by the above-described process. Another alternative could be to use edge detection techniques. A further alternative is to use knowledge of the domain in order to determine which color should dominate.

Figure 11:
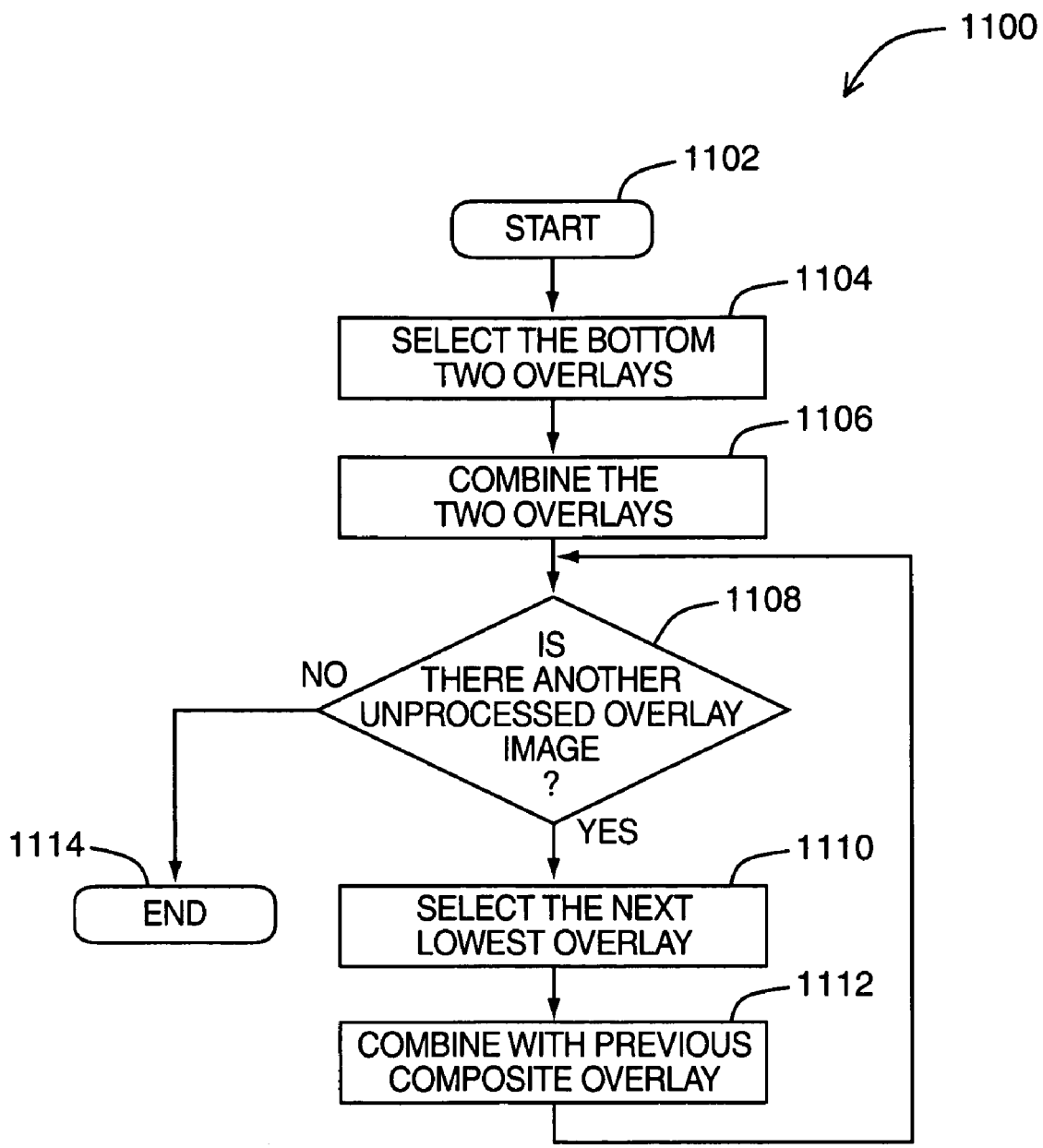
FIG. 11 is a flowchart diagram that illustrates the steps by which the overlay combining module of FIG. 2A combines multiple overlay images.

FIG. 11 is a flowchart illustrating the steps 1100 by which overlay combining module 22 of FIG. 2A combines multiple overlays. The process beings at step (1102). At step (1104), the bottom two overlays are selected. At step (1106), the two selected overlays are combined. For any regions of the overlay images that intersect, the resulting colour and alpha channels of each pixel can be determined according to the following equation:

$$A_{composite} = 1 - (1 - A_{upper})(1 - A_{lower}), \quad (4)$$

$$C_{composite} = \frac{(A_{upper}(1 - A_{lower})C_{upper} + A_{lower}C_{lower})}{A_{composite}}, A_{composite} > 0 \quad (5)$$

wherein $A_{composite}$ is the resulting alpha channel, $A_{upper}$ is the alpha channel of the upper overlay, $A_{lower}$ is the alpha channel of the bottom overlay, $C_{composite}$ is the vector of the resulting color channels, $C_{upper}$ is the vector of the color channels of the upper overlay, and $C_{lower}$ is the vector of the color channels of the lower overlay. Note that Equation (5) is only valid for non-zero values of $A_{composite}$. If $A_{composite}$ is zero then the color values at this pixel are not well defined. Thus, pixels with undefined color values may result from this step of combining overlay images. Such pixels are essentially outside the boundaries of the overlay and in the embodiments of system 10 presented herein do not require any separate calculation. Thus, in the embodiments presented herein, the color values may be set to a default color such as $C_{lower}$ or black. However, despite the fact that these pixels are not part of the overlay before scaling they affect the image that results from the scaling process. For this reason, if the color values of these pixels were set to default colors in the prior art techniques, then many of the artifacts discussed above could result from the scaling process. However, in the embodiments of system 10 presented herein the steps associated with the dilation of the color channels replace the relevant default colors with dilated colors and thereby prevent the occurrence of the above-mentioned artifacts.

At step (1108), it is determined whether there remains an overlay image that has not yet been processed. If not, then the process ends at step (1114). If yes, then step (1110) is executed. At step (1110), the next lowest overlay is selected. Then step (1112) is executed. At step (1112), the next lowest overlay is combined with the previous composite overlay to form a new composite overlay. The alpha and color channels are calculated according to the equation above. The previous composite overlay is now the lower overlay and the overlay selected at step (1110) is the upper overlay. After step (1112) is executed, step (1108) is repeated.

In order to better illustrate step (1106) of FIG. 11, reference is now made to FIGS. 12A and 12B. FIG. 12A illustrates the color channel portion of an overlay image 1200. The color portion of the overlay image 1200 comprises a strip of uniform color 1210. FIG. 12B illustrates the alpha channel portion of the overlay image 1200 of FIG. 12A. The alpha channel portion comprises a strip of uniform alpha values 1220 in the same position as the strip of color 1210. Thus, strip 1210 represents the color channels of a set of pixels in overlay image 1200 and strip 1220 represents the alpha channels of the same set of pixels. FIGS. 13A and 13B are similar to FIGS. 12A and 12B except that they are for a different overlay image. FIGS. 14A and 14B respectively illustrate the color channels and the alpha channels of an image 1400 formed by combining overlay images 1200 and 1300.

Only the points of intersecting color or alpha channels require new values to be calculated. Thus, the set of pixels corresponding to square color portion 1422 are the only pixels for which new color channel values must be calculated. Similarly, the set of pixels corresponding to square 1424 are the only pixels for which new alpha channel values must be calculated. In this example, Equation (5), which is given above, could be used to calculate the color values for square 1422. Similarly, Equation (4) could be used to calculate the alpha values 1424.

The process illustrated in FIG. 11 is exemplary only. For example, in many applications the alpha channels of the overlay images may be binary, as they are in some medical imaging technology such as IMPAX® and other Picture Archive and Communication Systems (PACS). In such a case, at any intersection point the color channel of the composite is more easily determined, as each pixel of each layer is either fully opaque or fully transparent.

It will be appreciated that while the embodiments of the overlay image scaling system 10 have been described in the context of various methods including methods for scaling multicolor and multilayer overlay images, it should be understood that it is equally applicable to other types of images. The system, processes and methods described are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

It should be understood that various modifications can be made to the embodiments described and illustrated herein, without departing from the embodiments, the general scope of which is defined in the appended claims.

The invention claimed is:

1. A method of scaling a composite overlay image and a background image in a computing device, wherein the composite overlay image comprises a plurality of pixels in a buffer memory and each pixel comprises at least one color channel and at least one alpha channel, said method comprising an image processor:
   (a) identifying a set of pixels of the composite overlay image, wherein at least one pixel of the composite overlay image has an alpha value of zero and a color value that is not well defined, said identifying comprising:
      (i) creating a binary alpha representation in the buffer memory corresponding to the composite overlay image;
      (ii) storing information in the binary alpha representation that is representative of the alpha channels and their corresponding pixel position in the composite overlay image;
      (iii) dilating the binary alpha representation to form a dilated alpha representation in the buffer memory;
      (iv) subtracting the binary alpha representation from the dilated binary alpha representation to form a subtracted binary alpha representation in the buffer memory;
      (v) identifying each of the binary values stored in the subtracted binary alpha representation that represent a non-zero alpha value and the corresponding position information; and
      (vi) identifying each of the overlay pixels corresponding to the position information identified in (v) as pixels to be dilated;
   (b) dilating the color channels of the identified pixels to form a dilated composite overlay image in the buffer memory;
   (c) scaling the dilated composite overlay image to form a scaled dilated composite overlay image in the buffer memory;
   (d) scaling the background image to form a scaled background image in the buffer memory; and
   (e) combining the scaled dilated composite overlay image with the scaled background image to produce a combined image in the buffer memory.

2. The method of claim 1, wherein the composite overlay image comprises a combination of at least two overlay images.

3. The method of claim 1, wherein at least part of the binary alpha representation comprises a binary value representative of the alpha value of a pixel of the overlay image.

4. The method of claim 3, wherein one binary value represents a zero alpha channel and the other represents a non-zero alpha channel.

5. The method of claim 1, wherein the binary representation is an array of range objects.

6. The method of claim 1, wherein the binary representation is a binary image.

7. The method of claim 1, wherein (iii) comprises:
   dilating the binary alpha representation to form a dilated alpha representation through the use of binary dilation.

8. The method of claim 1, wherein (c) comprises:
   scaling the composite overlay image through the use of a bilinear scaling algorithm;
and wherein (d) comprises:
   scaling the background image through the use of a bilinear scaling algorithm.

9. The method of claim 1, wherein (e) comprises:
   combining the scaled dilated composite overlay image with the scaled background image through the use of alpha blending.

10. A physical computer-readable medium upon which a plurality of instructions are stored, the instructions for performing the steps of the method as claimed in claim 1.

11. The method of claim 1, wherein the color value of at least one pixel of the combined image is a weighted average of a scaled dilated composite overlay image color value and a scaled background image color value.

12. The method of claim 11, wherein when performing (ii) an operation on said information will have no effect on the composite overlay image.

13. A system for scaling a composite overlay image and a background image, wherein the composite overlay image comprises a plurality of pixels and each pixel comprises at least one color channel and at least one alpha channel, said system comprising:
(a) a memory for storing the pixels associated with the overlay images;
(b) a processor coupled to the memory for:
  (i) identifying a set of pixels of the composite overlay image, wherein at least one pixel of the composite overlay image has an alpha value of zero and a color value that is not well defined, said identifying comprising:
    (A) creating a binary alpha representation corresponding to the composite overlay image;
    (B) storing information in the binary alpha representation that is representative of the alpha channels and their corresponding pixel position in the composite overlay image;
    (C) dilating the binary alpha representation to form a dilated alpha representation;
    (D) subtracting the binary alpha representation from the dilated binary alpha representation to form a subtracted binary alpha representation;
    (E) identifying each of the binary values stored in the subtracted binary alpha representation that represent a non-zero alpha value and the corresponding position information; and
    (F) identifying each of the overlay pixels corresponding to the position information identified in (E) as pixels to be dilated;
  (ii) dilating the color channels of the identified pixels to form a dilated composite overlay image;
  (iii) scaling the dilated composite overlay image;
  (iv) scaling a background image; and
  (v) combining the scaled dilated composite overlay image with the scaled background image to produce a combined image.

14. The system of claim 13, wherein the composite overlay image comprises a combination of at least two overlay images.

15. The system of claim 13, wherein at least part of the binary alpha representation comprises a binary value representative of the alpha value of a pixel of the overlay image.

16. The system of claim 15, wherein one binary value represents a zero alpha channel and the other represents a non-zero alpha channel.

17. The system of claim 13, wherein the binary representation is an array of range objects.

18. The system of claim 13, wherein the binary representation is a binary image.

19. The system of claim 13, wherein when performing (C) the processor is further adapted to:
dilate the binary alpha representation to form a dilated alpha representation through the use of binary dilation.

20. The system of claim 13, wherein when performing (iii) the processor is further adapted to:
scale the composite overlay image through the use of a bilinear scaling algorithm;
and wherein when performing (iv) the processor is further adapted to:
scale the background image through the use of a bilinear scaling algorithm.

21. The system of claim 13, wherein when performing (v) the processor is further adapted to:
combine the scaled dilated composite overlay image with the scaled background image through the use of alpha blending.

22. The system of claim 13, wherein the color value of at least one pixel of the combined image is a weighted average of a scaled dilated composite overlay image color value and a scaled background image color value.

23. The system of claim 22, wherein when performing (B) an operation on said information will have no effect on the composite overlay image.

* * * * *